US005602374A

United States Patent [19]

Tsumuji et al.

[11] Patent Number: 5,602,374

[45] Date of Patent: Feb. 11, 1997

[54] FIRE RECEIVER IN FIRE ALARM SYSTEM

[75] Inventors: Akio Tsumuji; Kouichi Hishino, both of Tokyo, Japan

[73] Assignee: Nohmi Bosai Ltd., Tokyo, Japan

[21] Appl. No.: 407,666

[22] Filed: Mar. 21, 1995

[30] Foreign Application Priority Data

Mar. 25, 1994 [JP] Japan .................................... 6-079616

[51] Int. Cl.[6] ........................................ G06F 17/00

[52] U.S. Cl. ............................ 235/375; 235/380

[58] Field of Search ..................... 235/380, 375

[56] References Cited

U.S. PATENT DOCUMENTS 4,988,988 1/1991 Kimura .............................. 235/375 X

FOREIGN PATENT DOCUMENTS 2224144 4/1990 United Kingdom .

OTHER PUBLICATIONS

Patent Abstracts of Japan, vol. 15, No. 207 (P-1207), 28 May 1991.

*Primary Examiner*—Harold Pitts

*Attorney, Agent, or Firm*— Wenderoth, Lind & Ponack

[57] ABSTRACT

A fire receiver enables a fire alarm system to be reliably set up while the work for installing the fire alarm system is simplified, even if an IC card storing necessary data cannot be prepared or even at a time when the operation of connecting all terminal devices to the fire receiver is not completed. When a connection of the IC card to a card reader is detected when power supply to the fire receiver is turned on, data stored in the IC card is fetched and the terminal devices are operated on the basis of the fetched data. When no connection of the IC card to the card reader is detected when the power supply is turned on, predetermined data is fetched from the terminal devices by polling the terminal devices, and the terminal devices are operated by the data fetched by polling.

6 Claims, 2 Drawing Sheets

FIRE RECEIVER IN FIRE ALARM SYSTEM

BACKGROUND OF THE INVENTION

1. Field of the Invention

The present invention relates to a fire receiver for use in a fire alarm system in which the fire receiver and terminal devices are connected through signal lines, and in which the fire receiver calls each terminal by polling, collects predetermined information therefrom and executes a predetermined control.

2. Description of Related Art

When a fire alarm system is installed, a plurality of terminal devices are connected to a fire receiver through signal lines and different addresses are assigned to the terminal devices. Data representing the correspondence or correlation between the addresses and the kinds of the connected terminal devices, data representing a linked relationship between fire detectors and controlled devices and other data are stored in a memory of the fire receiver. It is troublesome to write such categories of data one by one in the memory of the fire receiver in the place where the fire alarm system is installed. A method has therefore been proposed in which such data is previously stored in an IC card, which is inserted in a connector provided in the fire receiver at the installation site, so that the data stored in the IC card can be fetched to the fire receiver when power supply is turned on, whereby the operation of installing the fire alarm system can be simplified.

In general, it is not always possible that all the terminal devices of the fire alarm system are connected simultaneously to the signal lines connected to the fire receiver when the fire alarm system is installed. The terminal devices are usually connected separately in several days. If 200 terminal devices per day in a total of 2000 terminal devices, for example, are connected to complete the entire installation work in a total of ten days, it is preferable in terms of working efficiency to check the connections, wiring and the like each day after the connections of 200 terminal devices have been completed.

However, the operation of storing necessary data in the above-described IC card is ordinarily performed in a place different from the place where the fire alarm system is installed, and some of terminal devices to be set each day may be frequently changed depending upon the process of the installation work. Therefore, it is difficult to previously grasp, at the place of preparation of the IC card, the concrete procedure for installing specific terminal devices each day. As a result, it is practically impossible to suitably prepare the IC card according to the installation work and to effectively check the connections, wiring or the like of the terminal devices installed each day.

Even when all the terminal devices to be installed are completely installed, there is a need to perform the operation of writing necessary data in the memory of the fire receiver at the installation site if the IC card having the necessary data could not be prepared prior to the installation. For this reason, the work for installing the fire alarm system cannot be simplified or the preparation of the IC card storing the necessary data must be awaited before the completion of setup of the fire alarm system to simplify the installation work, that is, the period for setting up the fire alarm system must be extended.

SUMMARY OF THE INVENTION

An object of the present invention is to provide a fire receiver which enables a fire alarm system to be reliably set up while the work for installing the fire alarm system is simplified even if the IC card in which necessary data is stored cannot be prepared, or even at a time when the operation of connecting all terminal devices to the fire receiver is not completed.

To achieve this object, according to one aspect of the present invention, there is provided a fire receiver for use in a fire alarm system in which the fire receiver is connected to a plurality of terminal devices through signal lines, and in which the fire receiver calls each of the terminal devices by polling to collect predetermined information and to execute predetermined control, the fire receiver comprising card reading means for reading an IC card in which data on the terminal devices is stored, and control means connected to the terminal devices and the card reading means for making a detection as to whether the IC card is connected to the card reading means and controlling the terminal devices on the basis of the result of the detection.

This arrangement ensures that even if the IC card storing the necessary data cannot be prepared or even at a time when the operation of connecting all the terminal devices to the fire receiver is not completed, the fire alarm system can be reliably set up while the work for installing the fire alarm system is simplified.

According to another aspect of the present invention, there is provided a fire receiver for use in a fire alarm system in which the fire receiver is connected to a plurality of terminal devices through signal lines, and in which the fire receiver calls each of the terminal devices by polling to collect predetermined information and to execute predetermined control, the fire receiver comprising card reading means for reading an IC card in which data on the terminal devices is stored, and control means connected to the terminal devices and the card reading means for fetching the data stored in the IC card to operate the terminal devices on the basis of the fetched data if a connection of the IC card to the card reading means is detected when power supply to the fire receiver is turned on.

This arrangement also ensures that even if the IC card storing the necessary data cannot be prepared or even at a time when the operation of connecting all the terminal devices to the fire receiver is not completed, the fire alarm system can be reliably set up while the fire alarm system installation work is simplified.

According to still another aspect of the present invention, there is provided a fire receiver for use in a fire alarm system in which the fire receiver is connected to a plurality of terminal devices through signal lines, and in which the fire receiver calls each of the terminal devices by polling to collect predetermined information and to execute predetermined control, the fire receiver comprising card reading means for reading an IC card in which data on the terminal devices is stored, and control means connected to the terminal devices and the card reading means for fetching the data stored in the IC card to operate the terminal devices on the basis of the fetched data if a connection of the IC card to the card reading means is detected when power supply to the fire receiver is turned on, the control means fetching predetermined data from the terminal devices by polling the terminal devices to operate the terminal devices according to the data fetched by polling if no connection of the IC card to the card reading means is detected when power supply to the fire receiver is turned on.

This arrangement also ensures that even if the IC card storing the necessary data cannot be prepared or even at a time when the operation of connecting all the terminal devices to the fire receiver is not completed, the fire alarm system can be reliably set up while the fire alarm system installation work is simplified, and that it is possible to reliably recognize that the terminal devices are correctly installed on the basis of the data fetched by polling.

DESCRIPTION OF THE PREFERRED EMBODIMENT

Figure 1:
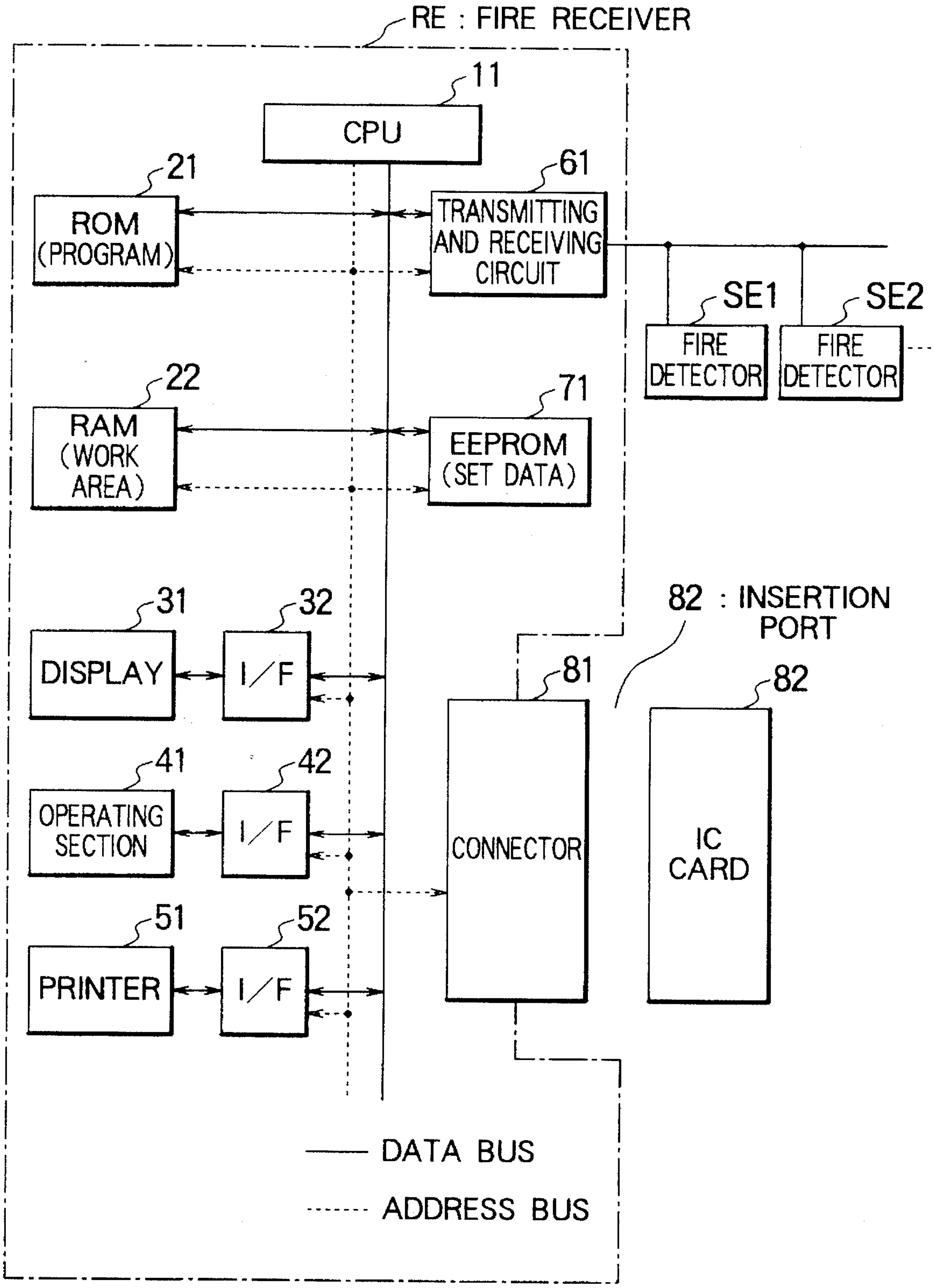
FIG. 1 is a block diagram of a fire receiver RE in accordance with an embodiment of the present invention.

Referring to FIG. 1, a fire receiver RE in accordance with an embodiment of the present invention is connected to terminal devices through signal lines in a fire alarm system. The fire receiver RE calls each terminal device to collect predetermined information and to execute a predetermined control.

Figure 2:
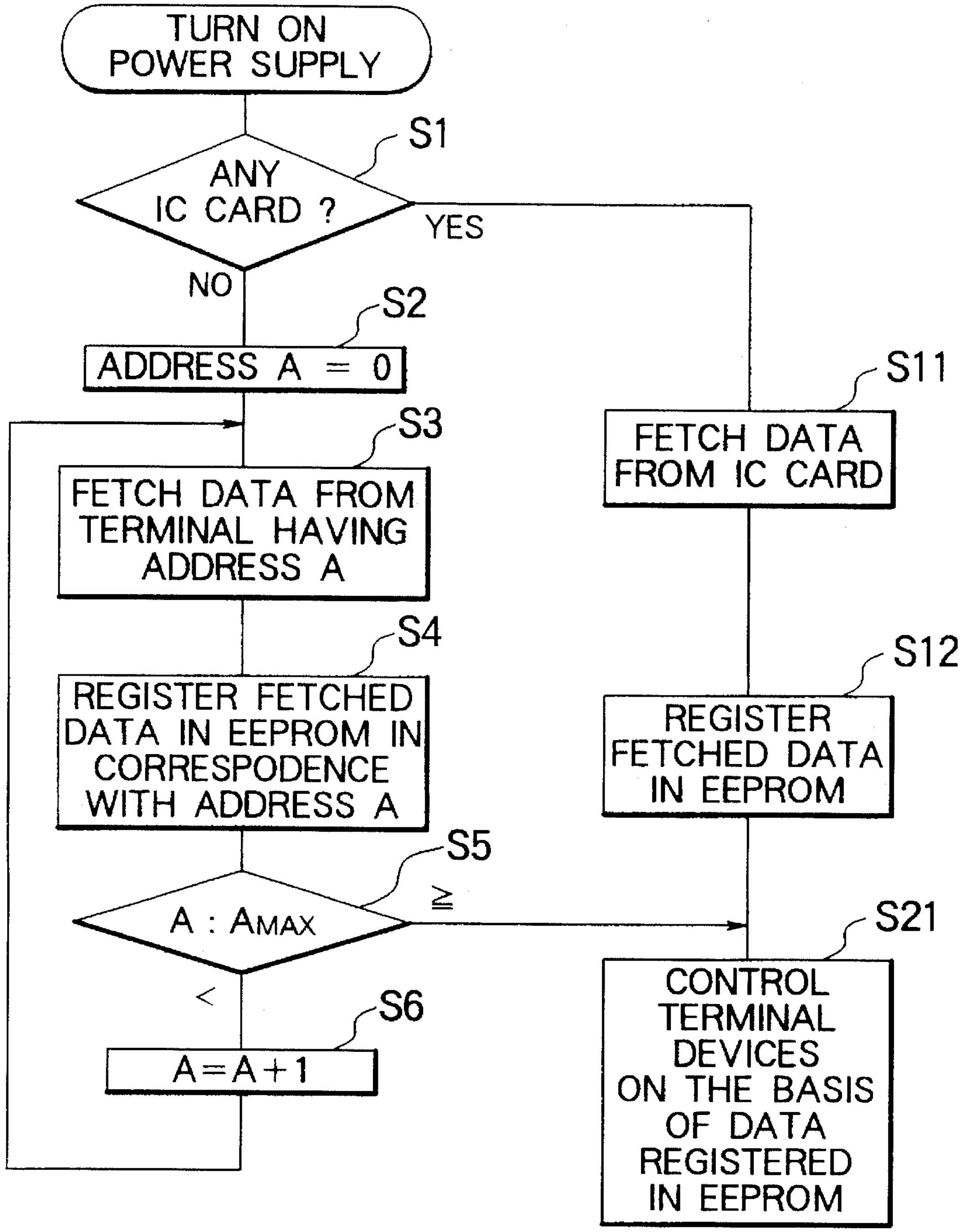
FIG. 2 is a flowchart of the operation of the fire receiver RE shown in FIG. 1.

The fire receiver RE has a CPU (microprocessor) 11 for performing an overall control of the receiver RE and for controlling the terminal devices connected to the fire receiver RE, a read only memory (ROM) 21 in which a program for controlling the receiver RE and the terminal devices connected to the receiver RE is stored, a random access memory (RAM) 22 used as a work area, a display 31 used to display fire areas, automatic testing places and the like and formed of a light emitting diode, a liquid crystal or the like, an interface 32 for the display 31, an operating section 41 in the form of a switch or the like, an interface 42 for the operating section 41, a printer 51, an interface 52 for the printer 51, a transmitting/receiving circuit 61 for exchanging signals with terminal devices such as fire detectors, transmitters and smoke-blocking and smoke exhausting equipment, and an electrically erasable and programmable ROM (EEPROM) 71 in which various categories of set data are stored. In the ROM 21, a program for performing a process represented by the flowchart shown in FIG. 2 is stored.

The receiver RE also has a connector 81 for connecting an IC card 82 to a bus in the receiver RE. In the IC card 82, data on the terminal devices such as the kinds and addresses of the terminal devices is stored.

An insertion port 80 through which the IC card 82 is inserted is formed in a front panel of the receiver RE. The insertion port 80 is normally closed with a lid member (not shown). It is not always necessary to provide a lid member for closing the insertion port 80.

The EEPROM 71 is a non-volatile memory for recording various categories of set data, such as linkage data representing a linked relationship between the fire detectors and the controlled equipment, correspondence data representing the correspondence between the addresses of the terminal devices and the places where the terminal devices are installed, data displayed on the display 31 of the fire receiver RE, and receiving function data representing the functions of the fire receiver RE. At least one of these categories of set data, i.e., the linkage data, correspondence data, display data and receiving function data is recorded in the EEPROM 71.

As examples of the terminal devices, fire detectors SE1, SE2, . . . are illustrated.

The CPU 11 and the ROM 21 are examples of card reading means for the IC card 82 storing data on the terminal devices. The CPU 11 and the ROM 21 are also examples of control means for fetching data stored in the IC card and operating the terminal devices by the fetched data if a connection of the IC card to the card reading means is detected when the power supply for the fire receiver is turned on, and for fetching predetermined data from the terminal devices by polling the terminal devices and operating the terminal devices according to the data fetched by polling if no connection of the IC card to the card reading means is detected when the power supply for the fire receiver is turned on.

The operation of the above-described embodiment will next be described.

FIG. 2 is a flowchart of the operation of the fire receiver in accordance with the above-described embodiment.

The power supply to the fire receiver RE is first turned on. If at this time the IC card 82 is not connected to the card reading means (Step S1), that is, if the IC card 82 is not connected to the connector 81, the fire receiver RE sets address A to "0" (Step S2) and fetches data from the terminal device corresponding to address A=0 (step S3). The data thereby fetched is allotted with address "0" and registered in EEPROM 71 (Step S4). Then, address A is incremented by 1 to set A=1 (Step S6), data is fetched from the terminal device corresponding to address A=1, and the data thereby fetched is allotted with address "1" and registered in the EEPROM 71 (Step S3, Step S4).

This sequence of operations is repeated until the maximum $A_{MAX}$ of set addresses is reached (Step S5). When address A becomes equal to the maximum $A_{MAX}$, fetching data from the terminal devices is stopped and the terminal devices are operated on the basis of the data stored in the EEPROM 71 (Step S21).

In this manner, the already-installed terminal devices and the kinds and the addresses of the terminal devices can be ascertained. That is, from this data, a list of the already-connected terminal devices can be printed by the printer 51, and it is possible to find a connection failure of one of the terminal devices to be installed or omission to install the terminal device, if the terminal device is not put in the list. It is also possible to ascertain a connection of a terminal device improperly selected if the combination of the address and the kind of the terminal device is different from the expected combination.

Even in a case where only a part of the terminal devices to be installed is installed, the actual installation state thereof can be detected as described above, and, therefore, in the course of the operation of installing terminal devices, it is possible to easily confirm the progress of the operation.

Even in a case where no IC card storing necessary data is prepared, it is possible to reliably set up the fire alarm system while simplifying the operation of installing the fire alarm system.

If an IC card 82 can thereafter be obtained, it is inserted into the insertion port 80 and connected to the connector 81. Then, data stored in the IC card 82 is fetched (Step S11) and the fetched data is registered in the EEPROM 71 (Step S12). Thereafter, the terminal devices are controlled on the basis of the registered data (Step S21).

In the above-described embodiment, categories of data fetched by the control means from terminal devices by polling the terminal devices are those representing the kinds and addresses of the terminal devices. Data representing the controlled state of the terminal devices may be fetched along with these categories of data. Each terminal device may return, to the fire receiver, a sending-back instruction from the fire receiver instead of returning data representing the kind, address and controlled state of the terminal device if the terminal device receives its self address, whereby the fire receiver can recognize that the terminal device corresponding to the address is correctly installed. In other words, the terminal device returns data representing its existence to the fire receiver RE. That is, the data fetched by the control means by polling each terminal device may be at least one of data representing the existence of the terminal device, data representing the kind of the terminal device, data representing the address and data representing the controlled state.

In the above-described embodiment, a connection of the IC card 82 to the card reading means is determined when a connection of the IC card 82 to the IC card connector 81 is detected. However, the arrangement may alternatively be such that a particular identification code or the like is provided in the IC card 82, and a connection of the IC card 82 to the card reading means is determined if it is detected that the identification code is equal to a predetermined identification code. In such a case, it is necessary to previously store collated identification codes in a memory means such as ROM 21 of the fire receiver RE. Such stored identification codes may be set according to the kind of the fire receiver, the installation site and other data. In this manner, it is possible to prevent an error in connecting IC card 82.

What is claimed is:

1. A fire receiver for use in a fire alarm system in which said fire receiver is connected to a plurality of terminal devices through signal lines, and in which said fire receiver calls each of said terminal devices by polling to collect predetermined information and to execute predetermined control, said fire receiver comprising:

card connecting means having a connector for an IC card in which data regarding said terminal devices is stored, said IC card being adapted to be connected to the connector within said fire receiver;

card reading means for reading the data stored in said IC card connected to said connector;

data fetching means for fetching the data stored in said IC card through said card reading means if a connection of said IC card to said card connecting means is detected when power supply to said fire receiver is turned on, and for fetching predetermined data from said terminal devices by polling said terminal devices if no connection of said IC card to said card connecting means is detected when power supply to said first receiver is turned on; and control means connected to said terminal devices and the data fetching means for operating said terminal devices according to the data fetched by said data fetching means.

2. A fire receiver according to claim 1, wherein a connection of said IC card to said card connecting means is determined if a connection of said IC card to said connector is detected.

3. A fire receiver according to claim 1, wherein a connection of said IC card to said card connecting means is determined if it is detected that an identification code of said IC card is equal to a predetermined identification code.

4. A fire receiver according to claim 1, wherein the data fetched by said data fetching means from said terminal devices by polling said terminal devices is at least one of categories of data representing an existence, the kind, an address and a controlled state of each of said terminal devices.

5. A fire receiver according to claim 1, wherein the data fetched by data fetching means from said terminal devices by polling said terminal devices is at least one of categories of data representing an existence, a kind, an address and a controlled state of each of said terminal devices, and wherein a connection of said IC card to said IC card connecting means is determined if a connection of said IC card to said IC card connector is detected.

6. A fire receiver according to claim 1, wherein the data fetched by data fetching means from said terminal devices by polling said terminal devices is at least one of categories of data representing an existence, a kind, an address and a controlled state of each of said terminal devices, and wherein a connection of said IC card to said card reading means is determined if it is detected that an identification code of said IC card is equal to a predetermined identification code.

* * * * *